United States Patent
Pohar

[11] Patent Number: 6,082,410
[45] Date of Patent: Jul. 4, 2000

[54] PORT PLUG

[75] Inventor: Charles M. Pohar, Spencer, Iowa

[73] Assignee: Sauer Inc., Ames, Iowa

[21] Appl. No.: 09/317,286

[22] Filed: May 24, 1999

[51] Int. Cl.[7] .................................................. B65D 59/02
[52] U.S. Cl. ..................... 138/89; 138/96 R; 138/96 T; 220/DIG. 19; 220/792; 220/793
[58] Field of Search ................. 138/96 T, 96 R, 138/89; 220/DIG. 19, 792, 787, 789, 793; 215/357, 358

[56] References Cited

U.S. PATENT DOCUMENTS

| | | | |
|---|---|---|---|
| D. 243,510 | 3/1977 | Shirey et al. ............................... | D8/8 |
| D. 243,582 | 3/1977 | Shirey ....................................... | D8/8 |
| D. 317,862 | 7/1991 | Yamanoto ................................. | D8/387 |
| D. 331,064 | 11/1992 | Wilson et al. ............................ | D8/387 |
| 1,218,753 | 3/1917 | Forg ........................................... | 74/553 |
| 1,346,496 | 7/1920 | Housley .................................... | 220/288 |
| 1,952,036 | 3/1934 | Dillhoefer, Jr. .......................... | 220/39 |
| 2,212,423 | 8/1940 | Lytle ....................................... | 138/96 T |
| 2,282,041 | 5/1942 | Draper ...................................... | 220/39 |
| 2,286,175 | 6/1942 | Wackman ................................. | 220/39 |
| 2,411,149 | 11/1946 | Dodson ................................... | 220/39 |
| 2,773,621 | 12/1956 | Hurley ..................................... | 220/39 |
| 2,842,282 | 7/1958 | Parish, Jr. et al. ....................... | 220/39 |
| 2,962,185 | 1/1960 | Starr et al. ............................... | 220/39 |
| 3,000,525 | 9/1961 | Leslie-Smith ............................ | 215/13 |
| 3,140,007 | 7/1964 | Nettleship ................................. | 220/97 |
| 3,606,073 | 9/1971 | Burke ................................. | 138/96 T X |
| 3,905,091 | 9/1975 | La Rocque ................................ | 29/460 |
| 3,944,114 | 3/1976 | Coppens .................................. | 220/288 |
| 4,004,709 | 1/1977 | Simkus .................................... | 220/257 |
| 4,020,874 | 5/1977 | Palarino ................................. | 138/96 T |
| 4,105,135 | 8/1978 | Bradshaw et al. ....................... | 220/288 |
| 4,111,326 | 9/1978 | Percarpio ............................. | 215/358 X |
| 4,119,121 | 10/1978 | Smiley ................................. | 138/96 T |
| 4,139,023 | 2/1979 | Turley .................................. | 138/96 T |
| 4,553,567 | 11/1985 | Telander .............................. | 138/96 T |
| 4,568,228 | 2/1986 | Rosan, Jr. ............................... | 411/178 |
| 4,706,836 | 11/1987 | Greck ...................................... | 220/256 |
| 4,740,727 | 4/1988 | Inaida et al. ............................. | 313/36 |
| 4,780,640 | 10/1988 | Hasegawa ................................ | 313/36 |
| 4,905,862 | 3/1990 | Dwinell et al. .......................... | 220/303 |
| 5,605,241 | 2/1997 | Imperioli ............................. | 220/789 X |
| 5,617,259 | 4/1997 | Inoue ..................................... | 359/820 |
| 5,877,583 | 3/1999 | Meglio et al. ............................ | 313/35 |

*Primary Examiner*—Patrick Brinson
*Attorney, Agent, or Firm*—Zarley, McKee, Thomte, Voorhees & Sease

[57] ABSTRACT

A plug for a threaded port is formed of resilient elastomeric material and has upper and lower ends. A smooth non-threaded outer cylindrical wall is disposed between the ends. The outer cylindrical wall has an outer diameter sufficient to frictionally engage the threads of the port. An outwardly protruding collar is disposed between the upper end and the outer cylindrical wall. An annular bead is integrally formed on the collar and is adapted to sealingly engage an inner peripheral surface of the port.

21 Claims, 4 Drawing Sheets

PORT PLUG

BACKGROUND OF THE INVENTION

The present invention relates the field of plugs for hydraulic ports. More particularly, the present invention relates to a port plug for hydraulic components having a SAE (Society of Automotive Engineers) straight (internal) thread o-ring boss port. The port plug of this invention is also adaptable to other types of ports.

When contaminate sensitive hydraulic components such as pumps, motors and the like are manufactured and prepared for shipment to a customer, frequently the connection ports have temporary "shipping" plugs installed. The purpose of these plugs is to seal hydraulic fluid such as oil inside the component during shipping, as well as to prevent external contaminants from entering the component. When the customer receives the hydraulic component and is preparing it for use, these temporary shipping plugs are removed and discarded so that permanent hydraulic fittings can be installed.

It is well known in the hydraulic industry to use plastic externally threaded plugs as temporary shipping plugs in hydraulic components. Various plastic materials, including, but not limited to, polyethylene, are commonly used. Such plugs are quite economical, readily available, relatively easy to use and are usually reliable. These plugs, however, have been found to occasionally present problems in use. If these externally threaded plastic plugs are not installed properly, cross-threading can result and plastic contaminants or shavings can be left in the ports of the hydraulic components when the plugs are removed. Subsequently, these plastic contaminants are ingested by the hydraulic component which can result in operational failure. Even with proper installation, some plastic shavings may be generated by the installation and removal processes and thereby contaminate the hydraulic component once the permanent hydraulic fittings are installed.

Therefore, a primary objective of the present invention is the provision of a resilient elastomeric plug that provides an effective seal for a hydraulic port and yet substantially reduces or eliminates any possible contamination resulting from the use of the plug.

A further objective of the present invention is a provision of a port plug that has an integral circumferential annular bead thereon for sealingly engaging the o-ring surface on a SAE threaded o-ring port.

A further objective of the present invention is a provision of a plug that has a smooth unthreaded outer diameter thereon for frictionally engaging the internal threads of a SAE port.

A further objective of the present invention is the provision of a plug which is simple to install and remove.

A further objective of the present invention is the provision of a plug which is economical to manufacture, as well as durable and reliable in use.

These and other objectives will be apparent from the drawings, as well as from the description and the claims which follow.

SUMMARY OF THE INVENTION

The present invention relates to a plug used to close and seal the outer end of a threaded orifice or port in a body member. More particularly, the plug is useful for temporarily sealing a SAE straight internal thread o-ring port in a hydraulic unit. The port plug of this invention does not have threads that mate with the SAE port.

The plug is constructed of a substantially resilient elastomeric material and has a smooth outer non-threaded cylindrical wall with a diameter sufficient to frictionally engage the threads of the threaded orifice. The plug also includes an outwardly protruding collar above the cylindrical wall and an annular bead is provided on the collar to sealingly engage the o-ring surface on the orifice and thereby prevent the fluid from escaping through the port.

A pull tab resides at the upper end of the plug. The user can grasp the tab and pull firmly on it to extract the plug from the port. A cavity extends into the plug through the pull tab so as to receive an insertion tool for forcing the plug into the orifice.

The invention provides a plug that is easy to install and remove, yet provides an effective seal and reduces the likelihood of contaminants being left in the hydraulic component when the plug is removed.

DETAILED DESCRIPTION OF THE PREFERRED EMBODIMENT

The port plug 10 is formed of a resilient elastomeric material, such as Nitrile, which is also referred to as Buna-N. This is a commonly used elastomer, especially for the manufacture of o-rings. Nitrile is inherently resistant to hydraulic fluids, transmission fluids and non-polar petroleum-based products. Preferably the Nitrile material has a useful temperature range of approximately −40° F. to 275° F. and has a hardness of 70–90 durometer. This hardness range has been found to provide good resistance to abrasion and adequate resilience. The plug material is preferably resistant to any significant abrasion that might result in shavings of elastomeric material being created during the installation and removal processes.

Figure 1:
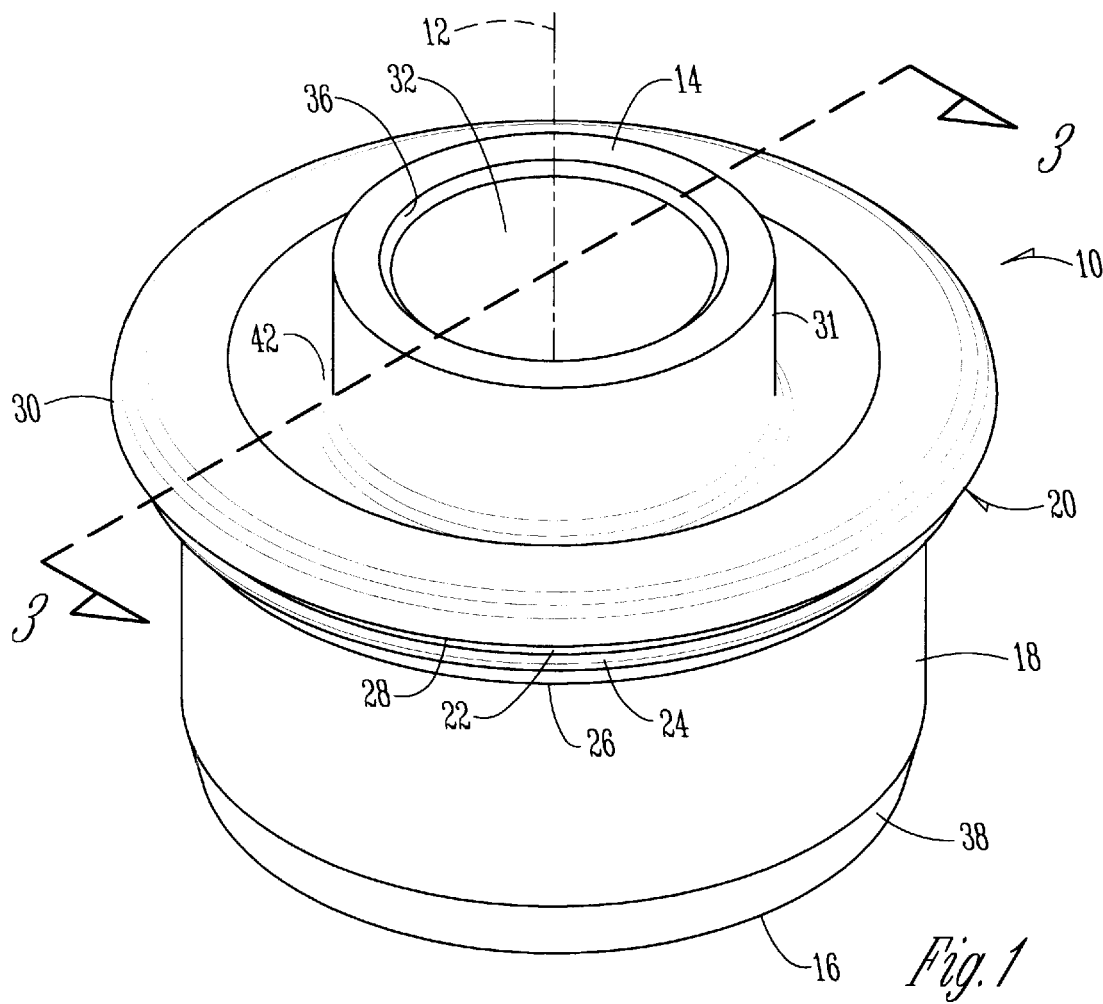
FIG. 1 is a perspective view of the plug of the present invention.

As is best seen in FIG. 1, the port plug 10 has a central axis 12, upper and lower ends 14, 16, and a smooth non-threaded outer cylindrical wall 18 disposed between the ends 14, 16.

The plug 10 also includes a collar 20 disposed between the upper end 14 and the outer cylindrical wall 18. The collar 20 protrudes outwardly from the outer cylindrical wall 18 and has an outwardly directed surface 22 thereon. The outwardly directed surface 22 includes a sloping planar surface disposed at an angle with respect to the central axis 12 of the plug 10. A protruding annular bead 24 is integrally formed on the outwardly directed surface 22. The bead 24 preferably has a semi-circular radial cross-section. The outwardly directed surface 22 also includes a lower shoulder 26 and an upper shoulder 28. The upper shoulder 28 forms the flat bottom surface of an outwardly protruding annular flange or cover flap 30.

Figure 2:
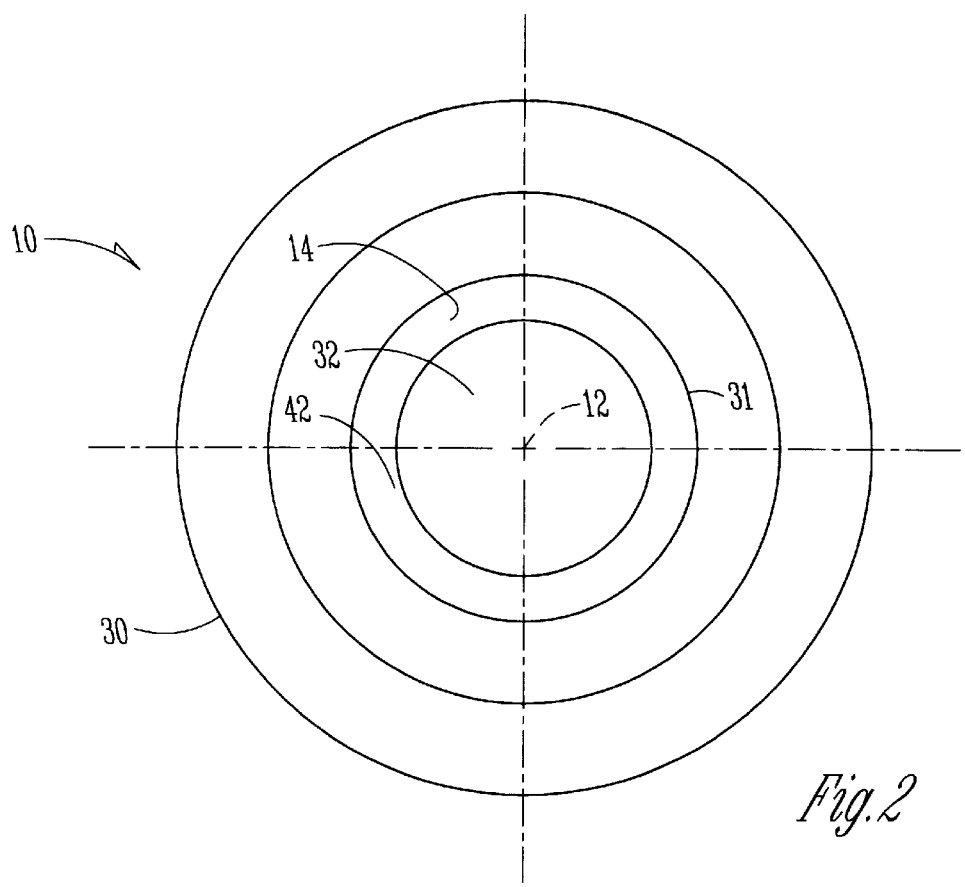
FIG. 2 is top plan view of the plug of FIG. 1.
Figure 3:
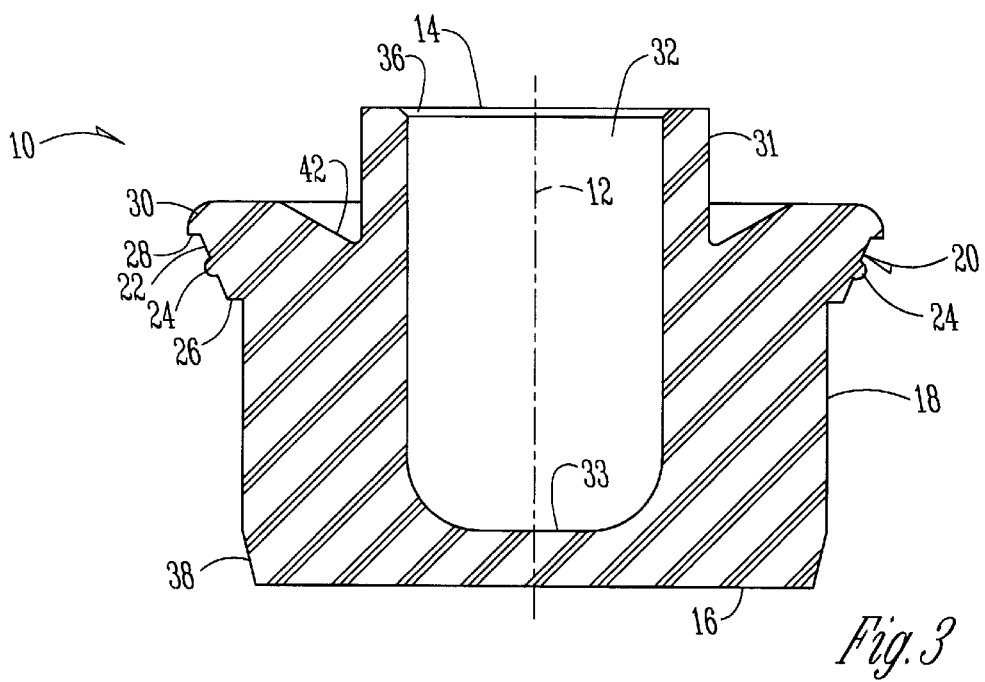
FIG. 3 is sectional view taken along line 3—3 in FIG. 1.

An annular pull tab 31, extends upwardly along the central axis 12 to the upper end 14 of the plug 10. A cavity 32 for receiving an installation tool 34 (see FIGS. 2–4)

extends from the upper end 14 to the bottom wall 33 of the plug 10. Preferably the cavity 32 is cylindrical and concentric with the annular pull tab 31 and the cylindrical wall 18. A lead-in chamfer 36 is provided at the open end of the cavity 32. A beveled peripheral edge 38 connects the outer cylindrical wall 18 with the lower end 16 of the plug 10. An annular trough or fillet 42 is provided where the outer diameter of the tab 31 joins the collar 20 and/or the cover flap 30. The trough 42 is generally V-shaped in a radial cross-section.

Figure 4:
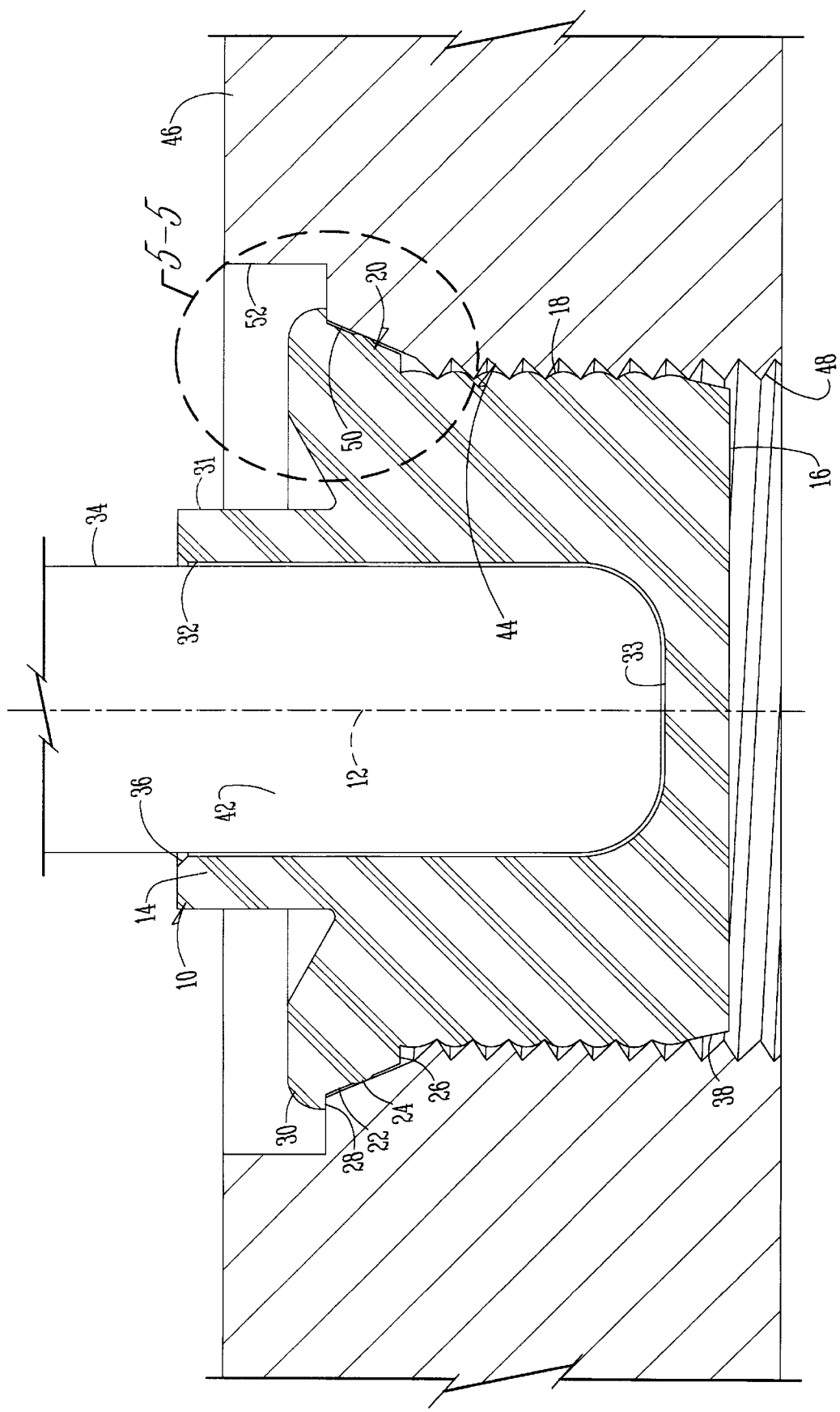
FIG. 4 is cross-sectional view of the plug similar to FIG. 3, but shows the plug installed into a SAE straight thread o-ring boss port. A portion of the installation tool is also shown.

FIG. 4 illustrates the use of plug 10 of the present invention to cover and seal a SAE (Society of American Engineers) straight thread o-ring port 44 in a wall 46 of a hydraulic component. As is conventional, the port 44 is an orifice extending through the wall 46 and having internal threads 48 on at least a portion thereof. An annular surface 50, which would conventionally receive an o-ring, is provided in the orifice. A counterbore 52 is typically provided at the entrance of the port 44.

Figure 5:
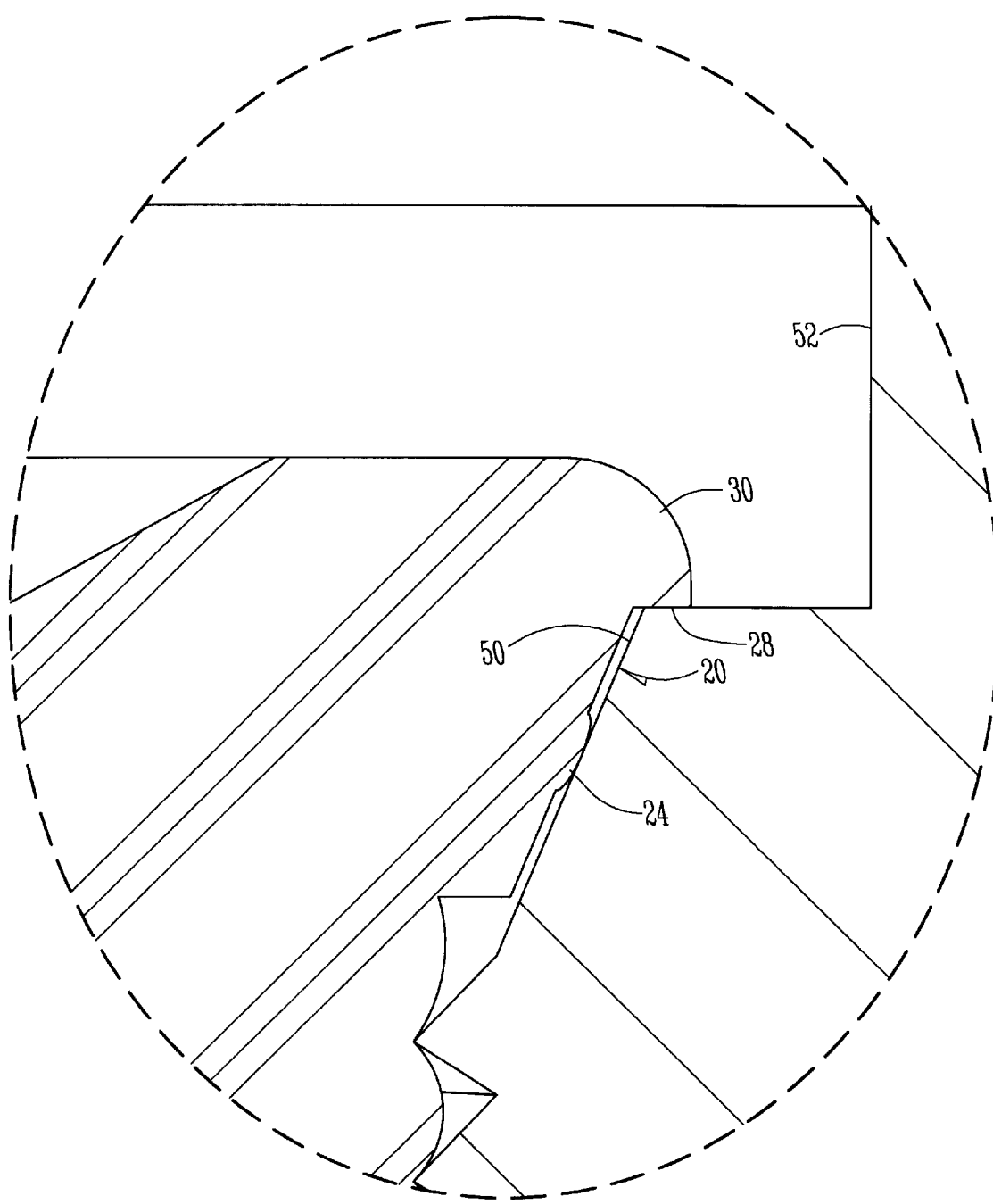
FIG. 5 is an enlarged partial cross-sectional view of the area designated on 5—5 in FIG. 4.

With the present invention, the installation tool 34 is inserted in the cavity 32 of the plug 10 as shown in FIG. 4. Then, the chamfered lower end 16 of the plug 10 is positioned generally concentric with the entrance of the port 44. The installer then forces the plug 10 into the port 44 with the installation tool 34. The installation tool 34 engages the bottom wall 33 of the plug 10 and forces the plug 10 into the port 44 until the outer cylindrical wall 18 is in frictional engagement with the threads 48. The plug 10 is fully inserted when the annular bead 24 is in sealing engagement with the annular o-ring surface 50 of the port 44. See FIG. 5. Thus, the resilient bead 24 provides the primary sealing surface for the plug 10.

The plug 10 can be removed by grasping the annular pull tab 31 and pulling it upwardly. Simultaneously squeezing the tab 31 inwardly may also assist in withdrawing the plug 10 from the port 44.

It is therefore seen that the invention at least achieves its stated objectives.

What is claimed is:

1. A plug to close and seal an outer end of a threaded orifice in a body member, comprising:
    a plug of resilient elastomeric material having generally opposite upper and lower ends and a smooth non-threaded outer cylindrical wall disposed therebetween, the outer cylindrical wall having an outer diameter sufficient to frictionally engage the threads of the threaded orifice, the lower end of the plug being closed;
    an outwardly and upwardly sloped collar integrally formed on the plug and disposed between the upper end and the outer cylindrical wall, the collar protruding outwardly from the outer cylindrical wall;
    a continuous annular bead integrally formed on the collar and being adapted to sealingly engage a sealing surface on the orifice, thereby defining a primary sealing surface of the plug.

2. A plug to close and seal an outer end of a threaded orifice in a body member, comprising:
    a plug of resilient elastomeric material having generally opposite upper and lower ends and a smooth non-threaded outer cylindrical wall disposed therebetween, the outer cylindrical wall having an outer diameter sufficient to frictionally engage the threads of the threaded orifice;
    a collar integrally formed on the plug and disposed between the upper end and the outer cylindrical wall, the collar protruding outwardly from the outer cylindrical wall;
    a continuous annular bead integrally formed on the collar and being adapted to sealingly engage a sealing surface on the orifice, thereby defining a primary sealing surface of the plug;
    the upper end of the plug comprising an integrally formed tab to permit grasping of the plug for extraction of the plug from the orifice;
    the tab being an upwardly protruding annular flange.

3. A plug to close and seal an outer end of a threaded orifice in a body member, comprising:
    a plug of resilient elastomeric material having generally opposite upper and lower ends and a smooth non-threaded outer cylindrical wall disposed therebetween, the outer cylindrical wall having an outer diameter sufficient to frictionally engage the threads of the threaded orifice;
    a collar integrally formed on the plug and disposed between the upper end and the outer cylindrical wall, the collar protruding outwardly from the outer cylindrical wall;
    a continuous annular bead integrally formed on the collar and being adapted to sealingly engage a sealing surface on the orifice, thereby defining a primary sealing surface of the plug;
    the plug having a cavity formed therein, the cavity having a closed lower end and an open end on the upper end of the collar to permit entry of an insertion tool for forcing the plug into the orifice.

4. A plug to close and seal an outer end of a threaded orifice in a body member, comprising:
    a plug of resilient elastomeric material having generally opposite upper and lower ends and a smooth non-threaded outer cylindrical wall disposed therebetween, the outer cylindrical wall having an outer diameter sufficient to frictionally engage the threads of the threaded orifice;
    a collar integrally formed on the plug and disposed between the upper end and the outer cylindrical wall, the collar protruding outwardly from the outer cylindrical wall;
    a continuous annular bead integrally formed on the collar and being adapted to sealingly engage a sealing surface on the orifice, thereby defining a primary sealing surface of the plug;
    the upper end of the plug comprising an integrally formed tab to permit grasping of a plug for extraction of the plug from the orifice;
    the upper end of the plug includes an annular trough surrounding the tab.

5. The plug of claim 1 wherein the collar has an outwardly directed surface thereon and the annual bead protrudes from the outwardly directed surface.

6. The plug of claim 1 wherein the elastomeric material has a hardness of 70–90 durometer.

7. The plug of claim 1 wherein the upper end of the plug comprises an integrally formed tab to permit grasping of the plug for extraction of the plug from the orifice.

8. The plug of claim 7 wherein the tab is an upwardly protruding annular flange.

9. The plug of claim 1 wherein a cavity is formed in the plug, the cavity having a closed lower end and an open end on the upper end of the collar to permit entry of an insertion tool for forcing the plug into the orifice.

10. The plug of claim 2 wherein the cavity is generally concentric to the outer diameter of the outer cylindrical wall.

11. The plug of claim 2 wherein the cavity extends far enough into the plug to define at least a portion of an inside diameter of the outer cylindrical wall.

12. The plug of claim 5 wherein the plug has a central axis and the outwardly directed surface of the collar is a sloping planar surface disposed at an angle with respect to the central axis of the plug.

13. The plug of claim 7 wherein an annular trough surrounds the tab.

14. The plug of claim 3 wherein the annular trough is generally V-shaped in a radial cross-section.

15. The plug of claim 1 wherein the bead has a generally semi-circular radial cross-section in a free state.

16. The plug of claim 1 wherein a beveled outer peripheral edge connects the lower end of the plug to the outer diameter of the outer cylindrical wall to facilitate insertion of the plug into the orifice; the lower end of the plug having a flat planar lower surface thereon that is planar and flat.

17. The plug of claim 1 wherein an annular cover flap is disposed on the collar above the bead, the cover flap having a flat lower surface extending outwardly with respect to the bead.

18. In combination, a hollow body member having a wall with an internally threaded fluid orifice therein and a removable plug for sealingly covering the orifice, comprising:

the hollow body member having a hollow interior compartment surrounded by a wall having an internally threaded orifice therethrough;

a plug of resiliently elastomeric material having upper and lower ends and a smooth non-threaded outer cylindrical wall disposed therebetween, the outer cylindrical wall having an outer diameter sufficient to frictionally engage the threads of the threaded orifice, the lower end of the plug being closed;

a collar disposed between the upper end and the outer cylindrical wall and protruding outwardly from the outer cylindrical wall, the collar having an outwardly directed surface thereon;

an annular bead integrally formed on the outwardly directed sealing surface and being adapted to sealingly engage a sealing surface on the orifice.

19. The combination of claim 18 wherein the outer end of the orifice terminates in a diagonally outwardly extending chamfered surface that engages the bead on the outwardly directed surface of the collar.

20. The combination of claim 18 wherein the outwardly directed surface of the collar is a sloped planar surface disposed at an angle with respect to a central axis of the plug.

21. The combination of claim 18 wherein an annular cover flap is integrally formed on the plug and has a lower surface extending outwardly from the collar above the bead and into engagement with a bottom surface of a counterbore in the wall surrounding the orifice.

* * * * *